(12) United States Patent
Vigeant et al.

(10) Patent No.: US 10,075,170 B2
(45) Date of Patent: Sep. 11, 2018

(54) VOTING CIRCUITS AND METHODS FOR TRUSTED FAULT TOLERANCE OF A SYSTEM OF UNTRUSTED SUBSYSTEMS

(71) Applicant: The Charles Stark Draper Laboratory, Inc., Cambridge, MA (US)

(72) Inventors: Richard L. Vigeant, Uxbridge, MA (US); Antonio E. de la Serna, Winthrop, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/692,024

(22) Filed: Aug. 31, 2017

(65) Prior Publication Data

US 2018/0076815 A1    Mar. 15, 2018

Related U.S. Application Data

(60) Provisional application No. 62/385,440, filed on Sep. 9, 2016, provisional application No. 62/385,435, filed on Sep. 9, 2016.

(51) Int. Cl.
*H03K 19/23* (2006.01)
*H03K 19/08* (2006.01)

(52) U.S. Cl.
CPC ......... *H03K 19/23* (2013.01); *H03K 19/0813* (2013.01)

(58) Field of Classification Search
None
See application file for complete search history.

(56) References Cited

U.S. PATENT DOCUMENTS 2,946,900 A    7/1960  Steinman et al.
3,522,455 A    8/1970  Thomas et al.
(Continued)

FOREIGN PATENT DOCUMENTS

WO    2018/048723 A1    3/2018

OTHER PUBLICATIONS

A. Avizienis, https://www.computer.org/csdl/proceedings/prdc/2004/2076/00/20760335.pdf (at p. 2 of 6 pages) 'A Fault Tolerance Infrastructure for High-Performance COTS-Based Computing in Dependable Space Systems', Vytautas Magnus University Kaunas, Lithuania, Proceedings 10th IEEE Pacific Rim Internet Symposium Dependable Computing (2004).

(Continued)

*Primary Examiner* — Anh Tran
(74) *Attorney, Agent, or Firm* — Hamilton, Brook, Smith & Reynolds, P.C.

(57) ABSTRACT

Circuits and methods for determining a majority vote from a plurality of inputs. An example circuit includes a voting input stage, a transfer stage, and an accumulating stage. The voting input stage includes at least three input switched capacitors. The transfer stage includes transfer switched capacitors corresponding to the input switched capacitors. The transfer switched capacitors charge a voting capacitor corresponding to each input switched capacitor during a state of a clock signal. The accumulating stage includes accumulating switched capacitors connecting the voting capacitors in series. The accumulating switched capacitors cause the charges of the voting capacitors to be accumulated during an alternate state of the clock signal. The accumulated charge of the voting capacitors represents a majority vote of the input switched capacitors.

21 Claims, 9 Drawing Sheets

(56) References Cited

U.S. PATENT DOCUMENTS

| | | | |
|---|---|---|---|
| 3,665,173 | A | 5/1972 | Bouricius et al. |
| 3,706,044 | A | 12/1972 | Hintze et al. |
| 3,818,243 | A | 6/1974 | McMahon |
| 4,015,246 | A | 3/1977 | Hopkins, Jr. et al. |
| 4,092,578 | A | 5/1978 | Fabian |
| 4,497,059 | A | 1/1985 | Smith |
| 4,562,575 | A | 12/1985 | Townsend |
| 4,570,261 | A | 2/1986 | Maher |
| 4,665,522 | A | 5/1987 | Lala et al. |
| 4,799,140 | A | 1/1989 | Dietz et al. |
| 4,907,232 | A | 3/1990 | Harper et al. |
| 4,984,241 | A | 1/1991 | Truong |
| 5,140,594 | A | 8/1992 | Haulin |
| 5,377,205 | A | 12/1994 | Shi |
| 5,423,024 | A | 6/1995 | Cheung |
| 5,526,288 | A | 6/1996 | Sacks et al. |
| 5,565,812 | A | 10/1996 | Soenen |
| 5,818,380 | A * | 10/1998 | Ito ................ H03M 1/0602 326/11 |
| 5,959,565 | A | 8/1999 | Taniuch et al. |
| 6,081,825 | A * | 6/2000 | Kohchi ................ G06F 7/00 708/801 |
| 6,161,196 | A | 12/2000 | Tsai |
| 6,570,411 | B1 | 5/2003 | Bardsley et al. |
| 6,593,804 | B1 | 7/2003 | Hojabri |
| 6,704,887 | B2 | 3/2004 | Kwiat et al. |
| 6,754,846 | B2 | 6/2004 | Rasmussen et al. |
| 6,850,098 | B2 | 2/2005 | Lee et al. |
| 6,856,925 | B2 | 2/2005 | Muhammad et al. |
| 7,908,520 | B2 | 3/2011 | Avizienis |
| 7,965,098 | B2 | 6/2011 | Wood et al. |
| 7,996,714 | B2 | 8/2011 | O'Conner et al. |
| 8,230,253 | B2 | 6/2012 | Butterworth |
| 8,327,248 | B2 | 12/2012 | Satterfield et al. |
| 8,464,091 | B2 | 6/2013 | Butterworth |
| 8,544,092 | B2 | 9/2013 | Hermann et al. |
| 8,817,597 | B2 | 8/2014 | Hall et al. |
| 9,367,375 | B2 | 6/2016 | Cornes et al. |
| 9,497,099 | B2 | 11/2016 | Vaananen et al. |
| 9,525,831 | B2 | 12/2016 | Scott |
| 2010/0021803 | A1 | 1/2010 | Wang |
| 2014/0084959 | A1 | 3/2014 | Youssefi |
| 2018/0074888 | A1 | 3/2018 | Vigeant et al. |

OTHER PUBLICATIONS

A. Avizienis & Assoc. Inc., http://ieeexplore.ieee.org/document/857581/ 'A fault tolerance infrastructure for dependable computing with high-performance COTS components', Published: Dependable Systems Networks. Proceedings Internet Conference, Santa Monica, CA USA (2000).

International Search Report and Written Opinion for International Application No. PCT/US2017/049666, entitled "Methods And Systems For Achieving Trusted Fault Tolerance Of A System Of Untrusted Subsystems," consisting of 14 pages. dated Jan. 12, 2017.

International Search Report and Written Opinion for International Application No. PCT/US2017/049648, entitled "Voting Circuits And Methods For Trusted Fault Tolerance Of A System Of Untrusted Subsystems," consisting of 13 pages. dated Jan. 12, 2017.

Namazi, A., et al., "Highly Reliable A/D Converter Using Analog Voting," IEEE International Conference on Computer Design, pp. 334-339 (2008).

Beamont, M. et al., Safer Path: Security Architecture Using Fragmented Execution and Replication for Protection Against Trojaned Hardware, Design, Automation & Test In Europe Conference & Exhibition (2012).

* cited by examiner

VOTING CIRCUITS AND METHODS FOR TRUSTED FAULT TOLERANCE OF A SYSTEM OF UNTRUSTED SUBSYSTEMS

RELATED APPLICATIONS

This application claims the benefit of U.S. Provisional Application Nos. 62/385,440 and 62/385,435, both filed on Sep. 9, 2016. The entire teachings of the above applications are incorporated herein by reference.

BACKGROUND

Computer servers of modern safety- and security-critical applications are challenged by arbitrary faults. Such faults can include malicious cyber threats (e.g., spoofing, unauthorized data access, state modification, deadlock, or instruction stream alteration), exploitation of design flaws, and vulnerabilities in a global supply chain. In addition to design flaws, under-constrained design methodology can create opportunities to unanticipated system stimulus that can cause unspecified consequences. Further, supply chain assurance is a growing concern, as fewer trusted foundries may exist, and counterfeit, cloned, over-produced, and recycled components have entered the supply chain of programs with a thorough chain-of-custody from trusted suppliers. Computer servers are a common target for malicious attack as they are critical shared resources. Thus, they are at risk with broad consequences in disruption of service or data compromise.

SUMMARY

The circuits and methods disclosed herein provide reliable fault tolerance solutions. One example embodiment is a circuit including a voting input stage, a transfer stage, and an accumulating stage. The voting input stage includes at least three input switched capacitors. The transfer stage includes transfer switched capacitors corresponding to the input switched capacitors. The transfer switched capacitors charge a voting capacitor corresponding to each input switched capacitor during a state of a clock signal. The accumulating stage includes accumulating switched capacitors connecting the voting capacitors in series. The accumulating switched capacitors cause the charges of the voting capacitors to be accumulated during an alternate state of the clock signal. The accumulated charge of the voting capacitors represents a majority vote of the input switched capacitors.

In some embodiments, the input switched capacitors can be configured to be switched by binary outputs of digital circuits, and the accumulated charge of the voting capacitors can be passed to a digital comparator. The input switched capacitors can be configured to be switched by binary outputs of a plurality of corresponding redundant digital circuits, and the accumulated charge can represent one digital output of the plurality of redundant digital circuits based on a majority of digital outputs of the redundant digital circuits.

In some embodiments, the transfer switched capacitors can be configured to charge the voting capacitors during a high state of the clock signal, and the accumulating switched capacitors can cause the charges of the voting capacitors to be accumulated during a low state of the clock signal. The accumulated charge of the voting capacitors can represent a high logic vote if the accumulated charge is greater than one half of the circuit supply voltage, and the accumulated charge of the voting capacitors can represent a low logic vote if the accumulated charge is less than one half of the circuit supply voltage.

The voting input stage can include 2F+1 input switched capacitors to provide fault tolerant consensus for F faults (N input switched capacitors=2F+1). The input switched capacitors can be coupled to a voltage divider to divide a circuit supply voltage among the input switched capacitors, and the voting input stage can be implemented using CMOS switches connecting the voltage divider. The voting input stage can include a resistive voltage divider at each of N input switched capacitors, where each resistive voltage divider is scaled to (N−1):1.

Another example embodiment is a method of determining a majority vote from a plurality of inputs. The method includes receiving at least three voting inputs. Each voting input is in the form of a high or low logical bit. The method further includes converting the voting inputs to analog voltages, resulting in analog voting voltages, and accumulating the analog voting voltages, resulting in an accumulated analog voting voltage. The accumulated analog voting voltage represents a majority vote of the voting inputs.

Receiving at least three voting inputs can include receiving 2F+1 inputs to provide fault tolerant consensus for F faults. A circuit supply voltage can be divided among the voting inputs. For each voting input, the corresponding analog voting voltage can be equal to the divided circuit supply voltage if the voting input is a high logical bit, and can be equal to a ground voltage if the voting input is a low logical bit.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 6 is a timing diagram illustrating example voltages, at various times, of components of the circuit of FIG. 2. FIG. 6 illustrates a fault relating to one of the input values.

FIG. 7 illustrates faults relating to two of the input values.

DETAILED DESCRIPTION

A description of example embodiments follows.

Commoditized commercial-off-the-shelf (COTS) processors are well supported by modern operating systems and offer long product lifecycles for implementation in servers. Client-server applications typically employ state-machine-based implementation of a software server process. In the Internet of Things (IoT), for example, high availability and reliability of a server is paramount for critical applications across distributed computing. Data, materials, and services are interconnected throughout the world, adding many new dimensions to well-established concerns of service disruption by equipment failure, environmental catastrophe, or malicious intrusion.

Trust Vulnerabilities

Computer servers of modern safety- and security-critical applications are challenged by arbitrary faults that can occur. Such faults can include malicious cyber threats, exploitation of design flaws, and vulnerabilities in a global supply chain. Cyber-attacks can include spoofing, unauthorized data access, state modification, deadlock, or instruction stream alteration. Malware has been met by a subscription business model of detection and patch for an accumulated catalog of threats, but it is a solution that will always lag malware development and impact computational performance. In addition to design flaws, under-constrained design methodology can create opportunities to unanticipated system stimulus that can cause unspecified consequences. Extended iterations of custom design and trusted fabrication at the high complexity of modern processors inevitably suffer from new exploitable flaws. Supply chain assurance is a growing concern, as fewer trusted foundries may exist, and counterfeit, cloned, over-produced, and recycled components have entered the supply chain of programs with a thorough chain-of-custody from trusted suppliers. Further, malicious Trojan logic or selectively adulterated fabrication can escape manufacturing testing and be deployed for ultimate activation/failure. Further, insider threat in the development process is significantly difficult to eliminate, even with trusted foundries.

Verification Methodology for Trusted Logic

ASIC design methodology of functional verification by comparison to an independently developed model is commonly used to flag bugs. That is, equivalent but diverse models developed from a single specification must agree in function. This concept is as useful for software as it is with hardware. Complex control path architectures with many corner cases, as is the case for a processor, are much harder to fully verify than pipelined, regular data path architectures. With time-to-market being a pressing need, modern complex commercial ASICs are released after constrained-random verification coverage that samples distinct test cases most likely and most critical to be covered by customers—but not exhaustive verification coverage, which would require an unacceptable number of years of verification. There is wide-spread acceptance in industry today that every complex ASIC tape-out has remaining unfound bugs, however minor. Formal verification methods can be used to ascertain that specific vulnerabilities do not exist, but this continues to be limited by computation complexity and characterization of both the model and a known vulnerability. Synthesizable assertions can also be extended from ASIC/FPGA verification to validation and deployed operation to assure that unspecified behavior does not occur. This has been employed in custom solutions for trusted microelectronics.

Fault-Tolerance Approaches to Trusted Server Operation

Computer servers are a common target for malicious attack because as they are critical shared resources. Thus, they are at risk with broad consequences in disruption of service or data compromise. Fault-tolerant approaches for highly-available services are means of exploiting distributed computing for replication and consensus of server state machines. Recovery can occur by acquiring a consensus state from a non-faulty processor replica. Faults can be arbitrary; that is, the precise cause does not require determination for a solution to be rendered. Fault-tolerant computing has matured in space applications, where a single event upset of digital computation is not uncommon. It is also useful for critical data applications for which distributed computing is not co-located, providing protection from earthquake, tsunami, power grid outage, or other natural disasters. Fault-tolerant computing concepts can be extended to modern multicore processor architectures, which can be adequate for faults due to single event upset. However, this does not consider other formidable vulnerabilities. Equivalent, but diverse, model comparison used in verification methodology can be extended to fault tolerant computing. Binary diversity on multicore processors can be used for detection of software intrusion. The notion of binary diversity is that any fault due to a cyber-attack or malware would not occur in the same way or at the same time across different cores. This is of conceptual interest, but inadequate for the many other possible vulnerabilities on identically replicated silicon design. That is, it is not sufficient to ensure Byzantine resilience from any arbitrary fault(s).

Diverse System Integration for Trusted Fault-Tolerance

Fault-tolerant principles posit that 2F+1 replicated state machines in consensus can permit F faults at every comparison with stable operation. For trusted operation, a distinct set of faults that can be detected by comparison of state machine replica output must be a superset of possible vulnerabilities. However, vulnerabilities can exist at various levels of an architecture's implementation. Therefore, implementation diversity of replicated state machines at appropriate layers of vulnerability can provide trusted operation for a fault tolerant architecture. A sufficiently diverse fault-tolerant solution can address all levels of vulnerability, e.g., compiler, operating system, processor architecture, digital logic design, fabrication technology, and foundry. Rather than presuming that trusted operation is designed into trusted components, one can consider the trusted integration of untrusted COTS components. This can apply to hardware and software. COTS voting replicas that have varied hierarchical implementation can be integrated into a single, trusted fault-tolerant server if all replicated state machines see the same input at the same time and have consensus on state machine output. This greatly simplifies the distributed computing paradigm of fault tolerance, where a state machine would otherwise never be certain if all others have seen the same input and in the same order.

A diversity of multiple untrusted COTS system components (hardware and/or software) engaged in redundant operation can be integrated to as a single consensus-based trusted system with a high degree of fault tolerance to, for example, unforeseen environmental interference, cyber-attack, supply chain counterfeit, inserted Trojan logic, or component design flaws. The degree of fault tolerance can be increased by increasing the degree of diversity of redundant operational nodes or by increasing the number of diversely implemented operational nodes.

Figure 1:
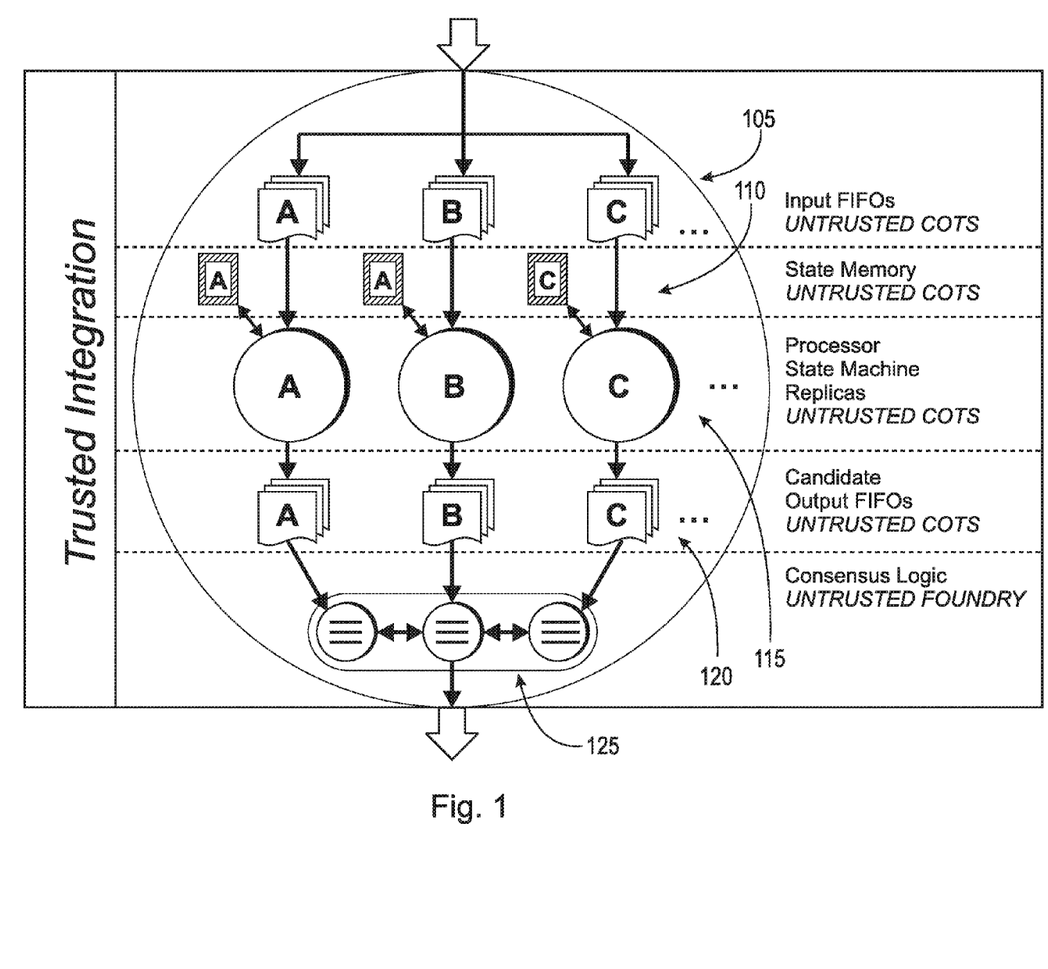
FIG. 1 is a schematic diagram illustrating hierarchical diversity for trusted fault tolerance, according to an example embodiment.

FIG. 1 is a schematic diagram illustrating hierarchical diversity for trusted fault tolerance, according to an example embodiment. FIG. 1 illustrates a conceptual design, for which trusted integration can employ scaled customizations of untrusted processor and memory diversity for any arbitrary application. The example is a COTS configuration that is resilient at all layers of implementation: application, operating system, processor architecture, logic implementation, fabrication process, and foundry.

Input is captured on Input FIFOs (queues) 105 of sufficient size for identically-ordered sequential processing at the server application bandwidth. Data units on the FIFOs 105 can have headers indicating the source and nature of payload data. These data units can be constructed for input to an amalgamated server to facilitate generalization from any incorporating system input transceiver or bus. Each processor 115 has dedicated state memory 110 for reference and update when evaluating input. This memory 110 can also provide a simplified recovery mechanism when there is a fault by permitting Direct Memory Access (DMA) from the state memory 110 of a consensus processor 115. A timer in a voting (consensus) circuit 125 can ensure completion of all candidate state machine output 120. Upon providing candidate state machine output to FIFOs 120 and notifying the voting circuit 125, processors 115 can await an interrupt from the voting circuit 125 to proceed to the next state. The voting circuit 125 can concurrently step through each data word on all candidate output FIFOs 120, performing exclusive-OR to check for a violation of consensus. Checksum comparison is not advised, since it is a mere indication of data uniqueness and can be spoofed.

In the case that the voting circuit 125 has detected a fault, it can enable DMA of state memory 110 from a replica that satisfied consensus. After DMA completion, the voting circuit 125 can trigger a next state to the processors 115 by interrupt. DMA latency to correct the state variables of the faulty processor can be masked by allowing non-faulty processors to concurrently proceed to next state if sufficient 2F+1 processors remain available.

In the case that a processor 115 is not able to deliver state output or a processor 115 repeatedly fails, the voting circuit 125 can include a hardwired-configuration to reboot the processor 115. When processors 115 fail to reach majority consensus or a majority fail to deliver state output, the voting circuit 125 can include a hard-wired configuration to reboot the system.

Because an aspect of this solution's strength is in its diversity, it follows that differing processor instruction sets, register sets, and addressing schemes can contribute to the many ways that the same state machine output can be accomplished. This can be ideal for trusted fault-tolerant server operation of a state machine replica. For the fault tolerant server, it does not matter how it arrives but that it does indeed arrive at output consensus. However, it should not be implied that processor diversity would also apply to the granularity of atomic operations evaluated at processor I/O in general purpose computing. This technique assures the defined application-specific objective of the hardware/ software amalgamation, rather than cycle-accurate operation of untrusted components at an arbitrary level of implementation.

Example Hierarchical Diversity for Trusted Fault Tolerance

An example configuration for PCB integration can implement a SQL database server handling requests from clients for access to an SQL database. This is a simplified example to demonstrate the merit of the conceptual architecture. A diversity of processors may be run on different real-time operating systems:

ST Microelectronics STM32 F0 (ARM Cortex M0) and FreeRTOS
Microchip PIC32MX (MIPS) and VxWorks RTOS
Freescale MPC8313E PowerQUICC II Pro (PowerPC) and Linux RTOS Three processors are selected for this example to handle at most one fault at any state machine consensus, but the example can be scaled to any 2F+1 arrangement.

Voting Circuit

Diversely implemented nodes of a redundant state-based functional system can submit votes by charging switched capacitors of a voting circuit. Integration of nodes can place these charges in tandem, for which voltage potential between the ground and the last node would be the consensus to be routed when a threshold majority is met, e.g., a voltage above or below the logic threshold for a Complementary Metal-Oxide-Semiconductor (CMOS)<<PLEASE PROVIDE EXAMPLE OF ALTERNATIVE CIRCUITRY>>. All nodes can sample the consensus output, and if the consensus output differs from a node's state, the node can revise its state based on the consensus output.

Figure 2:
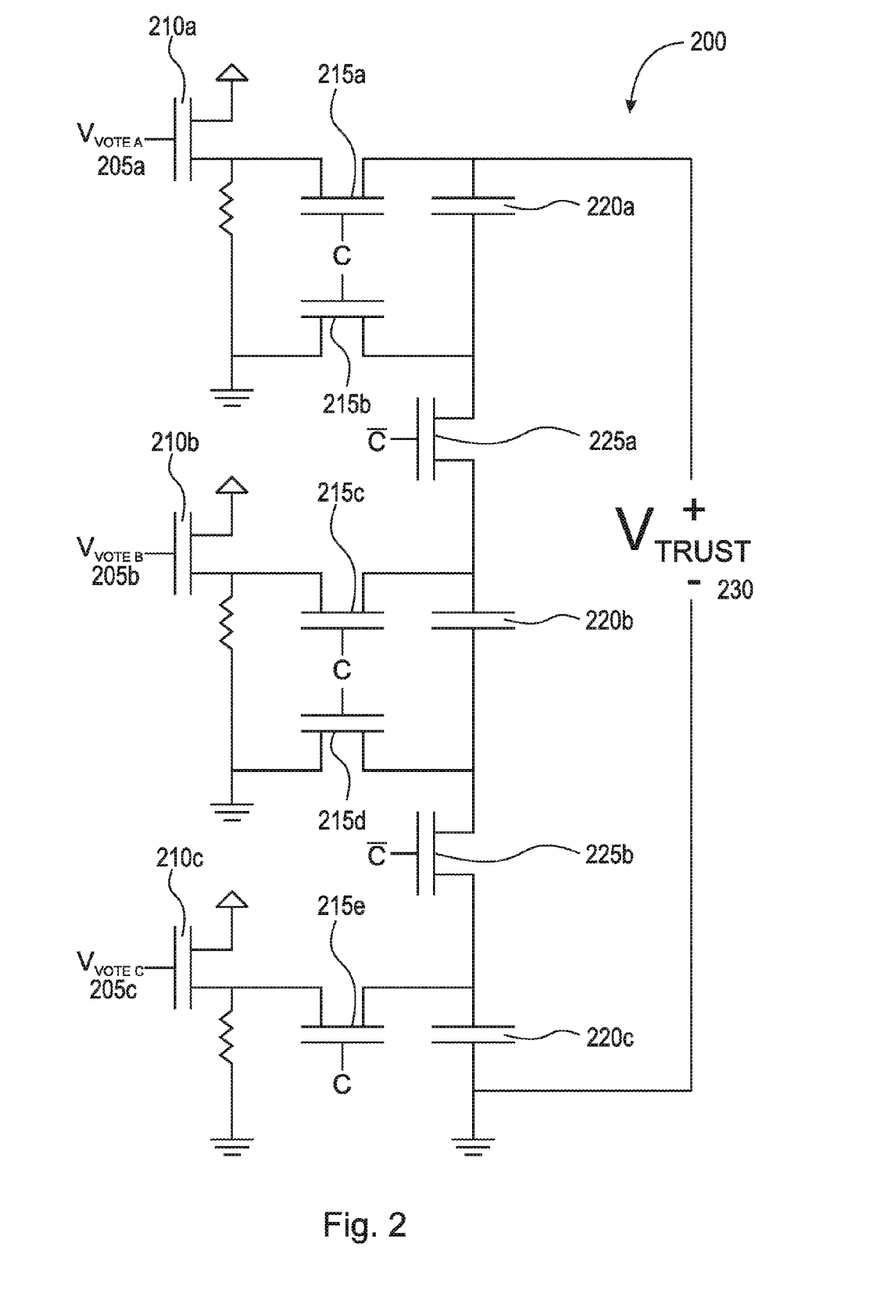
FIG. 2 is a circuit diagram illustrating a circuit for determining a majority value of three input values, according to an example embodiment.

FIG. 2 is a circuit diagram illustrating a circuit 200 for determining a majority value of three input values 205a-c, according to an example embodiment. The circuit includes a voting input stage, a transfer stage, and an accumulating stage. The voting input stage includes at least three input switched capacitors 210a-c. The transfer stage includes transfer switched capacitors 215a-e corresponding to the input switched capacitors 210a-c. The transfer switched capacitors 215a-e charge a voting capacitor 220a-c corresponding to each input switched capacitor 210a-c during a state of a clock signal. The accumulating stage includes accumulating switched capacitors 225a,b connecting the voting capacitors 220a-c in series. The accumulating switched capacitors 225a,b cause the charges of the voting capacitors 220a-c to be accumulated during an alternate state of the clock signal. The accumulated charge 230 of the voting capacitors represents a majority vote of the input switched capacitors 210a-c. The transfer switched capacitors 215a-e can charge the voting capacitors 220a-c during a high state of the clock signal, and the accumulating switched capacitors 225a,b can cause the charges of the voting capacitors 220a-c to be accumulated during a low state of the clock signal. The accumulated charge 230 of the voting capacitors 220a-c can represent a high logic vote if the accumulated charge 230 is greater than one half of the circuit supply voltage, and the accumulated charge 230 of the voting capacitors 220a-c can represent a low logic vote if the accumulated charge 230 is less than one half of the circuit supply voltage. The input switched capacitors 210a-c can be switched by binary outputs of digital circuits, and the accumulated charge 230 of the voting capacitors 220a-c can be passed to a digital comparator.

Figure 3:
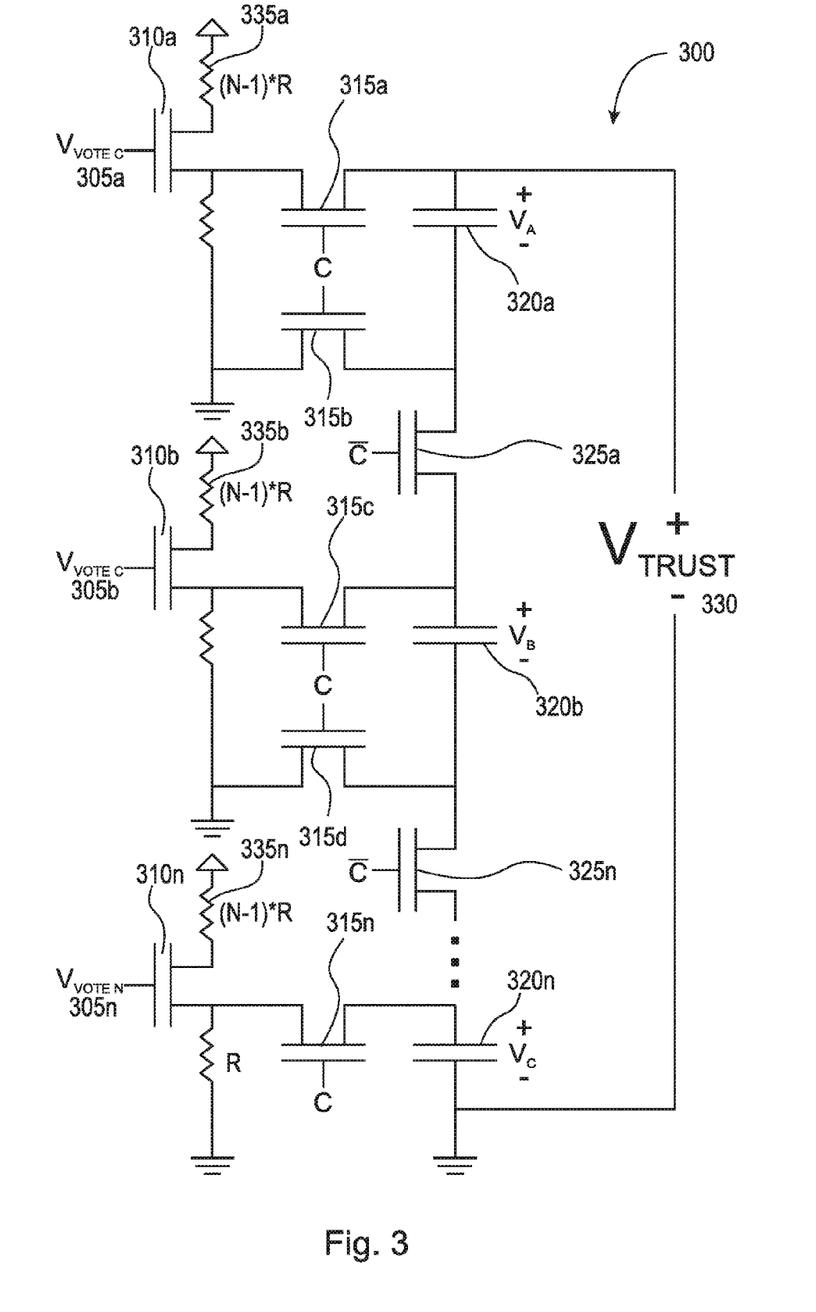
FIG. 3 is a circuit diagram illustrating a circuit for determining a majority value of N input values, according to an example embodiment.

FIG. 3 is a circuit diagram illustrating a circuit 300 for determining a majority value of N input values 305a-n, according to an example embodiment. The circuit includes a voting input stage, a transfer stage, and an accumulating stage. The voting input stage includes N input switched capacitors 310a-n. The transfer stage includes transfer switched capacitors 315a-n corresponding to the input switched capacitors 310a-n. The transfer switched capacitors 315a-n charge a voting capacitor 320a-n corresponding to each input switched capacitor 310a-n during a state of a clock signal. The accumulating stage includes accumulating switched capacitors 325a-n connecting the voting capacitors 320a-n in series. The accumulating switched capacitors 325a-n cause the charges of the voting capacitors 320a-n to be accumulated during an alternate state of the clock signal. The accumulated charge 330 of the voting capacitors represents a majority vote of the input switched capacitors 310a-n. The voting input stage can include 2F+1 input switched capacitors 310a-n to provide fault tolerant consensus for F faults (e.g., N=2F+1). The input switched capacitors 310a-n can be coupled to a voltage divider to divide a circuit supply voltage among the input switched capacitors 310a-n. The voting input stage can include a resistive voltage divider 335a-n at each of the input switched capacitors 310a-n, where each resistive voltage divider 335a-n is scaled to (N−1):1.

The illustrated circuit can be a bitwise analog voting circuit with a totem of switched capacitors connected in series by CMOS switches at evaluation of the aggregate (accumulated) voltage of stacked consensus, $V_{TRUST}$, but isolated from each other by these CMOS switches when the voting charge of each replica's bit is being transferred to each individual switched capacitor in the stack by parallel CMOS switches on the alternate phase of a driving clock, C. Note that the number of voting inputs to the analog circuit could support a quantity of three or greater voting replicas. An odd number can be used to reduce the chance of a split vote having ambiguous logic output. 2F+1 voting replicas would provide fault tolerant consensus for F faults. Thus, five replicas would be needed for Byzantine resilience in the case of two possible faults. Each voting input stage can be implemented with a CMOS switch connecting a voltage divider. While the number of voting replicas, N, can vary for the number of coincident faults that the system is to tolerate, the resistive voltage divider at each voting input can be scaled (N−1):1. This ensures that a unanimous vote of logic high at circuit inputs accumulates to no more than the supply voltage, logic high, at output. Thus, resistor proportions on each voltage divider is directly related to how many voting replicas are to be integrated for consensus voting to tolerate a particular number of faults at once.

The CMOS switch can be considered to be "off" at the voting input stage when a logic low is input. In such a case, no current is drawn from the supply across the voltage divider and there is no voltage drop on the lower resister— yielding ground voltage at the voting terminal (top of the lower resistor in the voltage divider). This voltage contribution to the consensus stack for $V_{TRUST}$ will be nil on the next phase of the driving clock. The CMOS switch can be considered to be "on" at the voting input stage when a logic high is input; that is, the CMOS switch shorts from transistor source to drain. When that happens, current flows from the power supply through the voltage divider to ground. The contribution $V_{TRUST}$ on the consensus stack will be 1/N*VCC, or 1/Nth of logic high. If $V_{TRUST}$ is over a CMOS threshold voltage for logic "1", then the bitwise consensus can be logic "1". Else, the consensus can be logic "0" at the digital output of the analog circuit. Thus, the circuit can employ an implicit comparison of the aggregate voltage of consensus to logic "0" or "1" when the output drives CMOS digital logic, and no analog comparator is needed.

Figure 4:
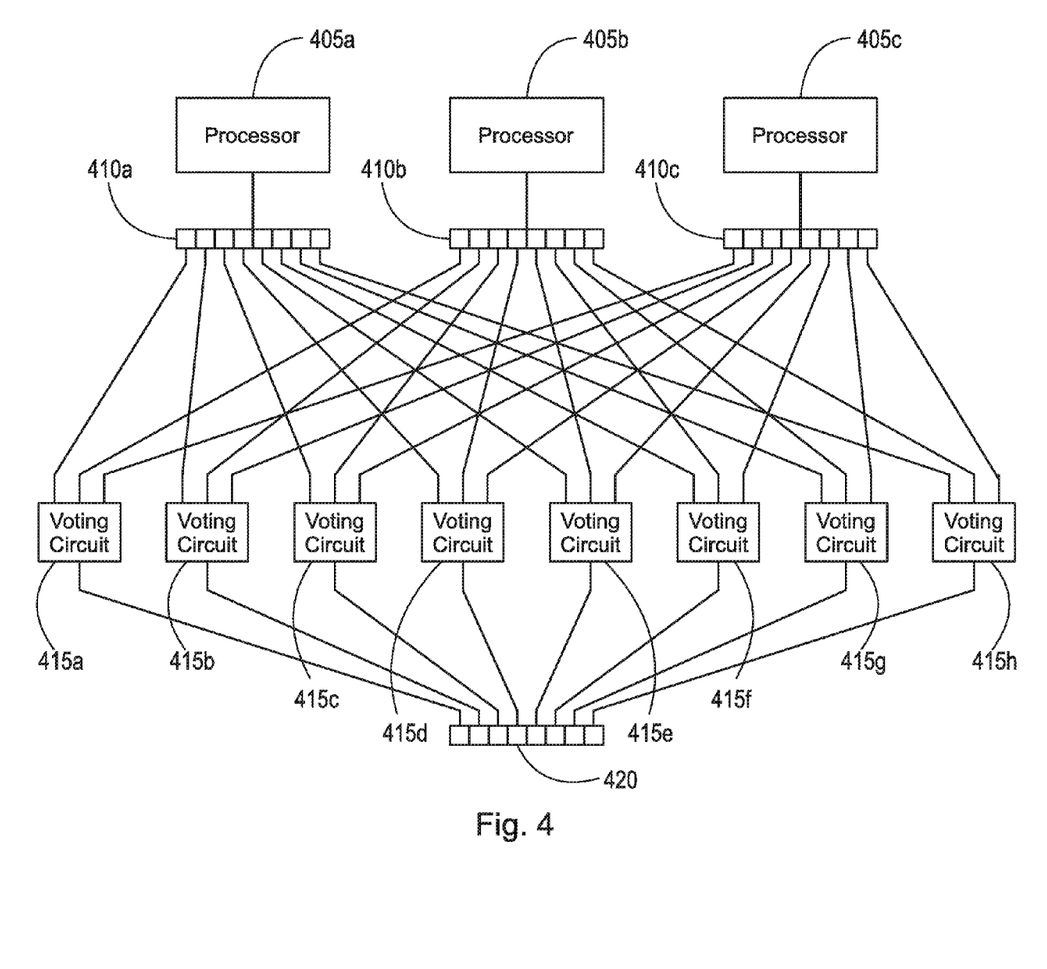
FIG. 4 is a schematic diagram illustrating eight voting circuits used to determine bit-by-bit a majority eight-bit value, according to an example embodiment.

FIG. 4 is a schematic diagram illustrating eight voting circuits 415a-h used to determine, bit-by-bit, a majority eight-bit value 420, according to an example embodiment. Fault tolerance can rely on voting replicas of the same functional unit, such that a compromised outlier does not hinder consensus-based operation. This can be resolved down to bitwise evaluation of the state of functional units, assessing each bit across replicas by majority vote. Since multiple replicas can be integrated to use voting (consensus) as a safe operation, a voting unit can be utilized. Voting on bit states by digital means could introduce metastable flip-flop fault, but if voting by an analog means, an exhaustive sweep test across bounded temperature and power can assure resilient performance.

Three redundant processors 405a-c are illustrated in FIG. 4. The processors 405a-c can perform the same functions, but each has a different architecture. Representations of eight-bit output data 410a-c from the processors 405a-c are also illustrated. Corresponding bits from each of the output data 410a-c are provided to eight corresponding voting circuits 415a-h. Each voting circuit 415a-h determines a majority value from the received input bits of the output data 410a-c, and the eight voting circuits 415a-h provide a resulting consensus output 420 based on the eight majority values. Thus, for example, if an output bit from one of the processors is incorrect, the consensus output 420 will not include the incorrect bit.

Figure 5:
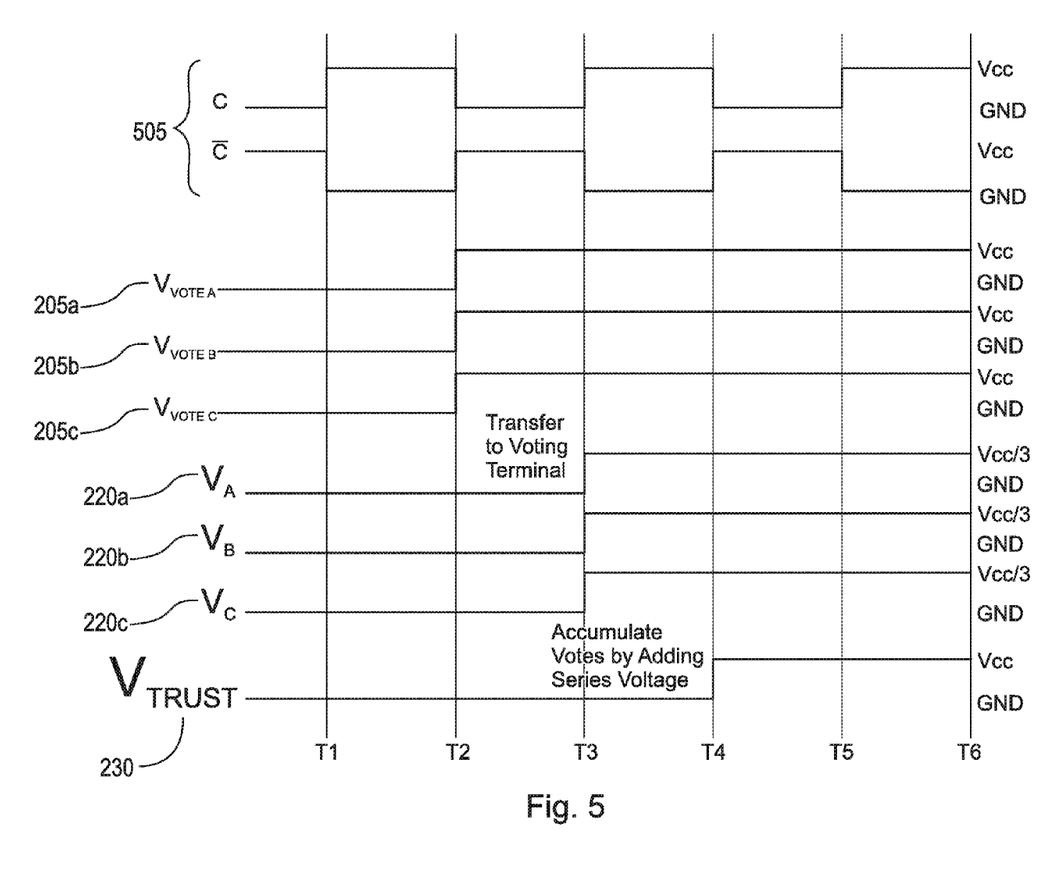
FIG. 5 is a timing diagram illustrating example voltages, at various times, of components of the circuit of FIG. 2.

FIG. 5 is a timing diagram illustrating example voltages, at various times, of components of the circuit of FIG. 2. The timing diagram shows values 505 of a driving clock C and its opposite value ("not C"). The value of C is high at times T1, T3, and T5. The value of "not C" is high at T2, T4, and T6. The timing diagram also shows the values of the three input values 205a-c, the three voting capacitors 220a-c, and the accumulated charge ($V_{TRUST}$) 230.

The timing diagram illustrates that the three input values 205a-c are changed to high at time T2. At time T3, when the driving clock C is high, the three voting capacitors 220a-c are shown as being high. This is because the transfer stage of circuit 200 charges the voting capacitors 220a-c corresponding to each input switched capacitor 210a-c during a high state of the clock signal. At time T4, when the driving clock C is low (and "not C" is high), the accumulated charge ($V_{TRUST}$) 230 is shown as being high. This is because the accumulating stage of circuit 200 causes the charges of the voting capacitors 220a-c to be accumulated during a low state of the clock signal.

Figure 6:
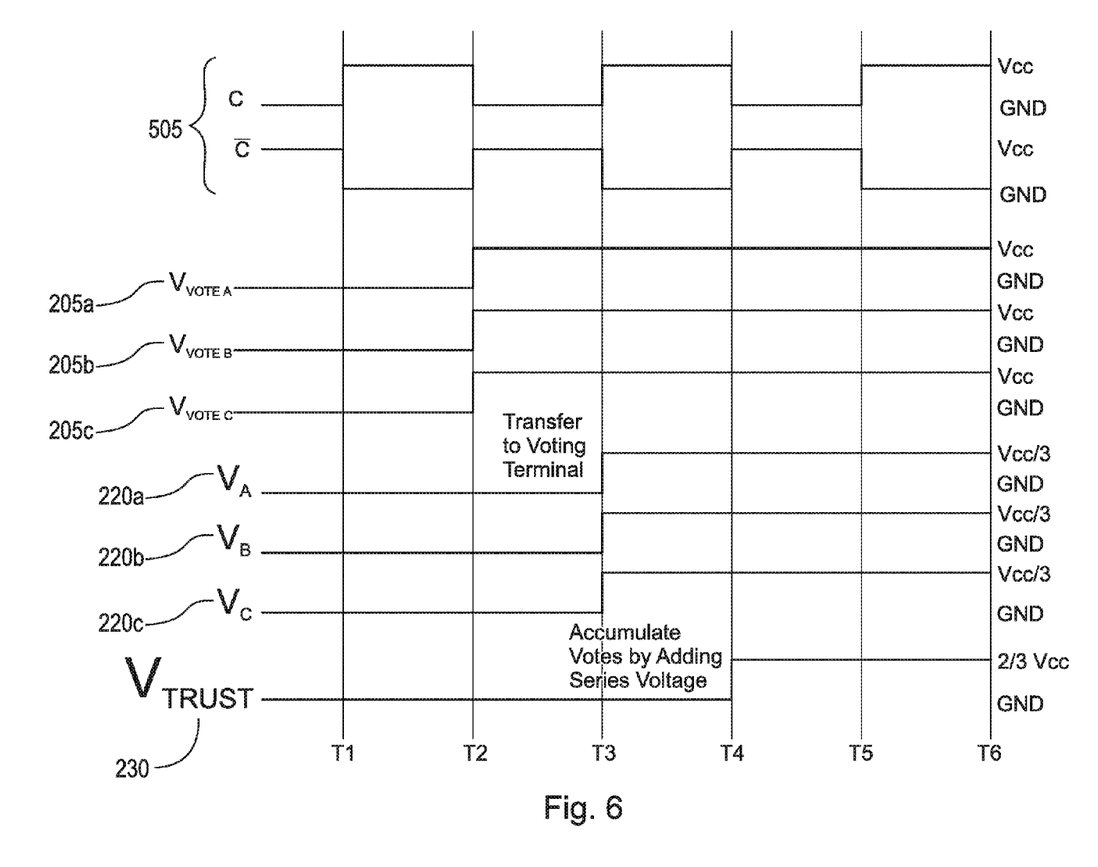

FIG. 6 is a timing diagram illustrating example voltages, at various times, of components of the circuit of FIG. 2. FIG. 6 illustrates a fault relating to one of the input values. The fault can be seen at time T2 where input value 205c is low while the other input values 205a,b are high. When all components are functioning correctly, the input values should agree. Thus, the low value of input 205c represents a fault. At time T4, when the three values are accumulated, the accumulated value 230 is high as it is still above a threshold value (2 out of 3) for logical high, thereby correcting the fault at input 205c.

Figure 7:
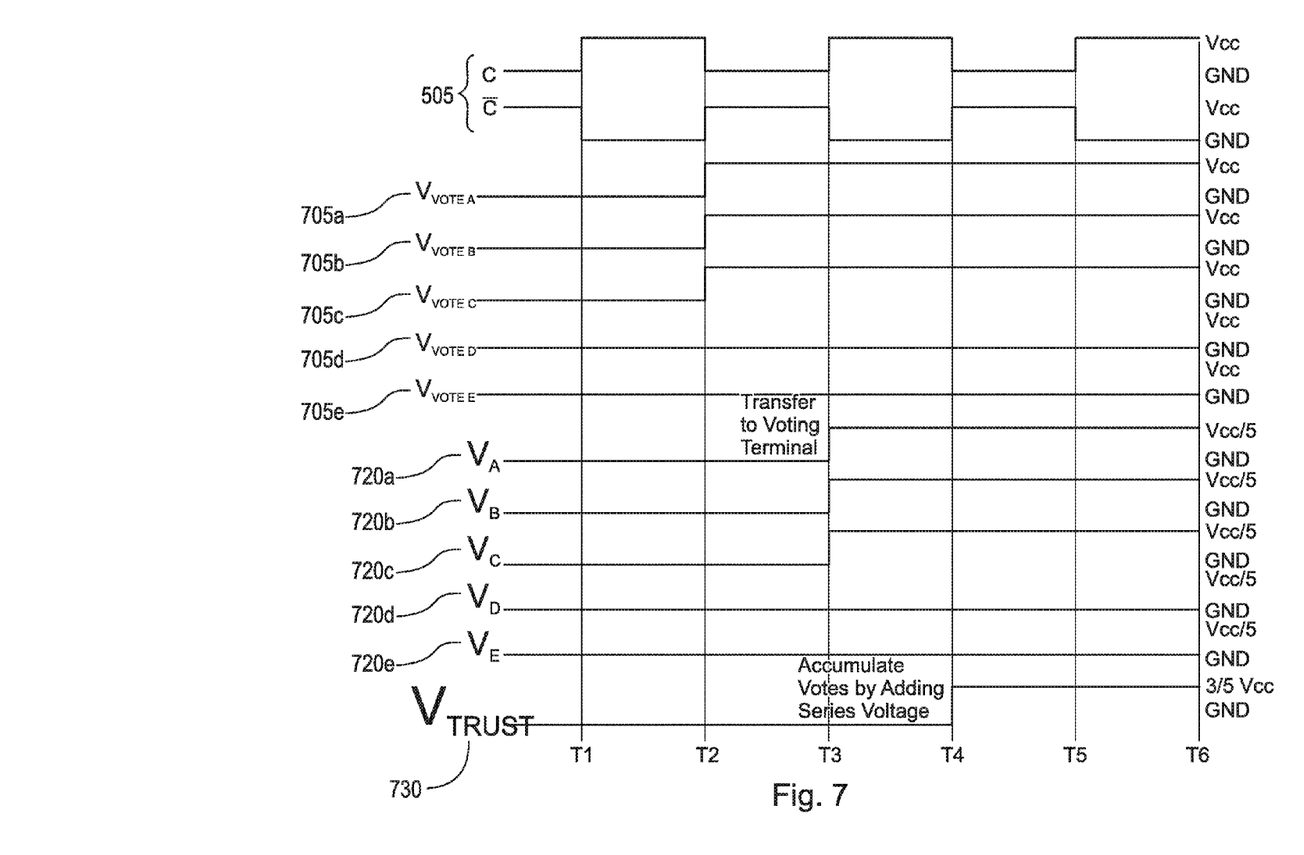
FIG. 7 is a timing diagram illustrating example voltages, at various times, of components of a voting circuit with five input values.

FIG. 7 is a timing diagram illustrating example voltages, at various times, of components of a voting with five input values. FIG. 7 illustrates faults relating to two of the input values. The timing diagram shows values 505 of a driving clock C and its opposite value ("not C"). The value of C is high at times T1, T3, and T5. The value of "not C" is high at T2, T4, and T6. The timing diagram also shows the values of the five input values 705a-e, five voting capacitors 720a-e, and an accumulated charge ($V_{TRUST}$) 730. Two faults can be seen at time T2, where input values 705d and 705e are low while the other input values 705a-c are high. Again, when all components are functioning correctly, the input values should agree. Thus, the low values of inputs 705d and 705e represent two faults. At time T4, when the five values are accumulated, the accumulated value 730 is high as it is still above a threshold value (3 out of 5) for logical high, thereby correcting the faults at inputs 705d and 705e.

Figure 8:
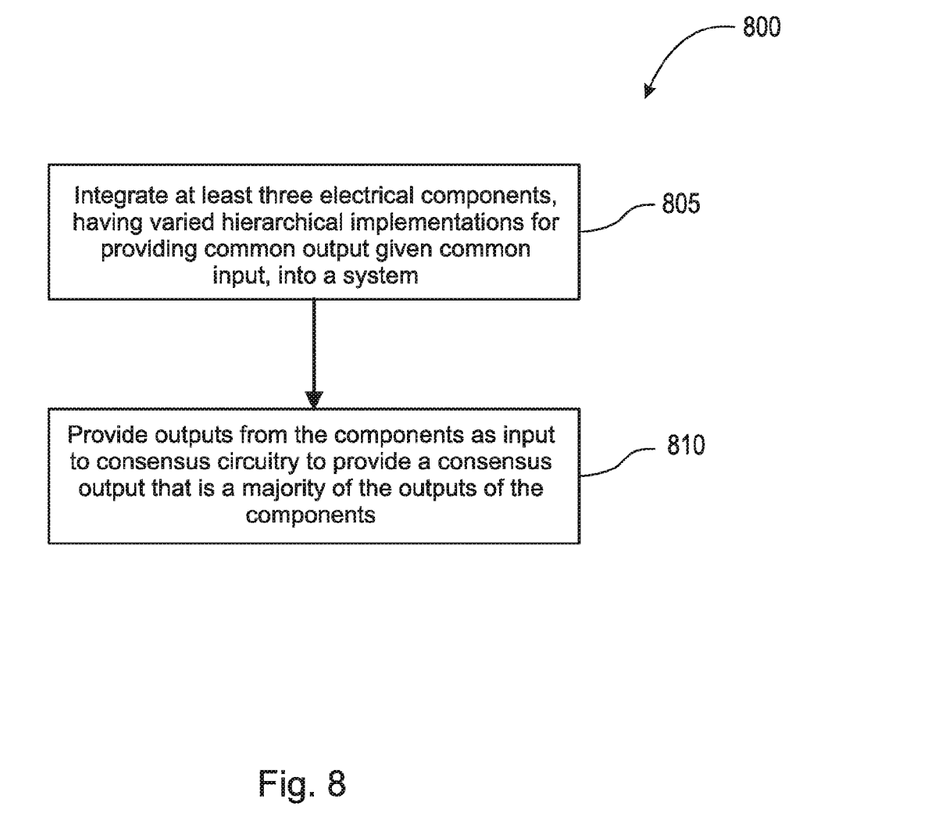
FIG. 8 is a flow chart illustrating a method of providing trusted integration of untrusted components, according to an example embodiment.

FIG. 8 is a flow chart illustrating a method 800 of providing trusted integration of untrusted components, according to an example embodiment. The example method 800 includes integrating 805 at least three electronic components into a system. The components have varied hierarchical implementations for providing common output given common input. The method 800 further includes providing 810 outputs from the components as input to consensus circuitry to provide a consensus output that is a majority of the outputs of the components.

Figure 9:
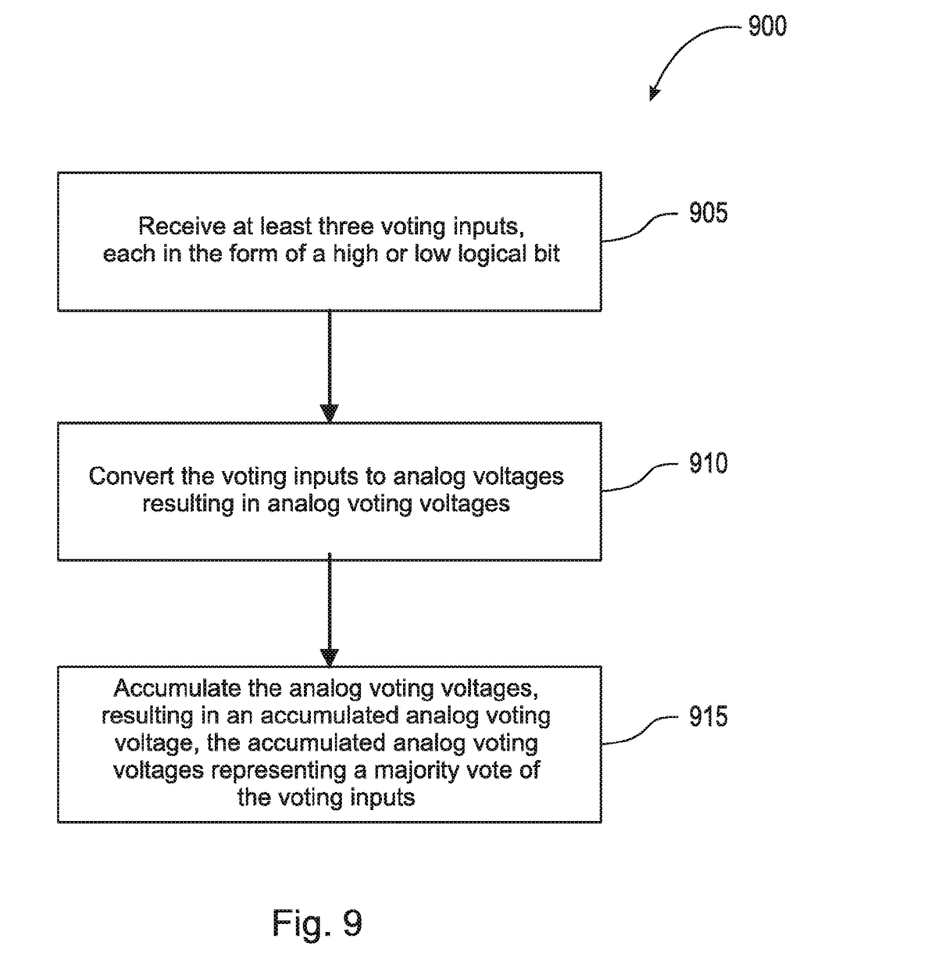
FIG. 9 is a flow chart illustrating a method of determining a majority vote from a plurality of inputs, according to an example embodiment.

FIG. 9 is a flow chart illustrating a method 900 of determining a majority vote from a plurality of inputs, according to an example embodiment. The example method 900 includes receiving 905 at least three voting inputs. Each voting input is in the form of a high or low logical bit. The method 900 further includes converting 910 the voting inputs to analog voltages, resulting in analog voting voltages, and accumulating 915 the analog voting voltages, resulting in an accumulated analog voting voltage. The accumulated analog voting voltage represents a majority vote of the voting inputs. Receiving at least three voting inputs can include receiving 2F+1 inputs to provide fault tolerant consensus for F faults. A circuit supply voltage can be divided among the voting inputs. For each voting input, the corresponding analog voting voltage can be equal to the divided circuit supply voltage if the voting input is a high logical bit, and can be equal to a ground voltage if the voting input is a low logical bit.

While example embodiments have been particularly shown and described, it will be understood by those skilled in the art that various changes in form and details may be made therein without departing from the scope of the embodiments encompassed by the appended claims.

What is claimed is:

1. A circuit comprising:
   a voting input stage including at least three input switched capacitors;
   a transfer stage including transfer switched capacitors corresponding to the input switched capacitors, the transfer switched capacitors charging a voting capacitor corresponding to each input switched capacitor during a state of a clock signal; and
   an accumulating stage including accumulating switched capacitors connecting the voting capacitors in series, the accumulating switched capacitors causing the charges of the voting capacitors to be accumulated during an alternate state of the clock signal, the accumulated charge of the voting capacitors representing a majority vote of the input switched capacitors.

2. A circuit as in claim 1 wherein the voting input stage includes 2F+1 input switched capacitors to provide fault tolerant consensus for F faults.

3. A circuit as in claim 1 wherein the input switched capacitors are configured to be switched by binary outputs of digital circuits.

4. A circuit as in claim 1 wherein the input switched capacitors are coupled to a voltage divider to divide a circuit supply voltage among the input switched capacitors.

5. A circuit as in claim 4 wherein the voting input stage is implemented using CMOS switches connecting the voltage divider.

6. A circuit as in claim 4 wherein the voting input stage includes a resistive voltage divider at each of N input switched capacitors, each resistive voltage divider being scaled to (N−1):1.

7. A circuit as in claim 1 wherein the transfer switched capacitors are configured to charge the voting capacitors during a high state of the clock signal.

8. A circuit as in claim 1 wherein the accumulating switched capacitors cause the charges of the voting capacitors to be accumulated during a low state of the clock signal.

9. A circuit as in claim 1 wherein the accumulated charge of the voting capacitors is passed to a digital comparator.

10. A circuit as in claim 1 wherein the accumulated charge of the voting capacitors represents a high logic vote if the accumulated charge is greater than one half of the circuit supply voltage, and wherein the accumulated charge of the voting capacitors represents a low logic vote if the accumulated charge is less than one half of the circuit supply voltage.

11. A circuit as in claim 1 wherein the input switched capacitors are configured to be switched by binary outputs of a plurality of corresponding redundant digital circuits, and wherein the accumulated charge represents one digital output of the plurality of redundant digital circuits based on a majority of digital outputs of the redundant digital circuits.

12. A method comprising:
    receiving at least three voting inputs, each in the form of a high or low logical bit;
    converting the voting inputs to analog voltages, resulting in analog voting voltages; and
    accumulating the analog voting voltages, resulting in an accumulated analog voting voltage, the accumulated analog voting voltage representing a majority vote of the voting inputs.

13. A method as in claim 12 wherein receiving at least three voting inputs includes receiving 2F+1 inputs to provide fault tolerant consensus for F faults.

14. A method as in claim 12 wherein the voting inputs correspond to binary outputs of digital circuits.

15. A method as in claim 12 wherein converting the voting inputs to analog voltages includes dividing a circuit supply voltage among the voting inputs, and for each voting input, the corresponding analog voting voltage being equal to the divided circuit supply voltage if the voting input is a high logical bit.

16. A method as in claim 12 wherein converting the voting inputs to analog voltages includes dividing a circuit supply voltage among the voting inputs, and for each voting input, the corresponding analog voting voltage being equal to a ground voltage if the voting input is a low logical bit.

17. A method as in claim 12 wherein converting the voting inputs to analog voltages includes converting the voting inputs during a high circuit clock signal.

18. A method as in claim 12 wherein accumulating the analog voting voltages includes accumulating the analog voting voltages during a low circuit clock signal.

19. A method as in claim 12 further including passing the accumulated analog voting voltage to a digital comparator.

20. A method as in claim 12 wherein the accumulated analog voting voltage represents a high logic vote if the accumulated analog voting voltage is greater than one half of the circuit supply voltage, and wherein the accumulated analog voting voltage represents a low logic vote if the accumulated analog voting voltage is less than one half of the circuit supply voltage.

21. A method as in claim 12 wherein the voting inputs correspond to binary outputs of a plurality of redundant digital circuits, and wherein the accumulated analog voting voltage represents one digital output of the plurality of redundant digital circuits based on a majority of digital outputs of the redundant digital circuits.

\* \* \* \* \*